US011017674B1

(12) United States Patent
Patterson et al.

(10) Patent No.: US 11,017,674 B1
(45) Date of Patent: May 25, 2021

(54) MANAGING AND TRACKING SCOUTING TASKS USING AUTONOMOUS VEHICLES

(71) Applicant: Waymo LLC, Mountain View, CA (US)

(72) Inventors: Katharine Patterson, Palo Alto, CA (US); Laurens Andreas Feenstra, San Francisco, CA (US); Peter Colijn, San Francisco, CA (US); Austin Daniel Abrams, Los Altos, CA (US)

(73) Assignee: Waymo LLC, Mountain View, CA (US)

( * ) Notice: Subject to any disclaimer, the term of this patent is extended or adjusted under 35 U.S.C. 154(b) by 281 days.

(21) Appl. No.: 16/160,137

(22) Filed: Oct. 15, 2018

(51) Int. Cl.
*G08G 1/00* (2006.01)
*G05D 1/02* (2020.01)
*G05D 1/00* (2006.01)
*G01C 21/32* (2006.01)
*G06F 16/29* (2019.01)

(52) U.S. Cl.
CPC ............. *G08G 1/202* (2013.01); *G01C 21/32* (2013.01); *G05D 1/0088* (2013.01); *G05D 1/0291* (2013.01); *G06F 16/29* (2019.01); *G05D 2201/0207* (2013.01); *G05D 2201/0213* (2013.01)

(58) Field of Classification Search
CPC ...... G08G 1/202; G06F 16/29; G05D 1/0088; G05D 1/0291; G05D 2201/0207; G05D 2201/0213; G01C 21/32
See application file for complete search history.

(56) References Cited

U.S. PATENT DOCUMENTS

| | | | |
|---|---|---|---|
| 8,352,112 B2 | 1/2013 | Mudalige | |
| 9,805,605 B2 | 10/2017 | Ramanujam | |
| 2012/0323431 A1* | 12/2012 | Wong et al. | ........... G01C 21/32 701/25 |
| 2013/0289858 A1 | 10/2013 | Mangiat et al. | |
| 2017/0131727 A1 | 5/2017 | Kurdi et al. | |
| 2018/0299274 A1* | 10/2018 | Moghe et al. | ........... G06F 16/29 |
| 2019/0137282 A1* | 5/2019 | Minowa et al. | ........ G01C 21/32 |
| 2019/0278297 A1* | 9/2019 | Averhart et al. | ..... G05D 1/0088 |
| 2019/0339709 A1* | 11/2019 | Tay et al. | ............. G05D 1/0088 |
| 2019/0392635 A1* | 12/2019 | Ma et al. | ................ G01C 21/32 |
| 2020/0072616 A1* | 3/2020 | Shi et al. | ................ G06F 16/29 |

* cited by examiner

*Primary Examiner* — Dale W Hilgendorf
(74) *Attorney, Agent, or Firm* — Botos Churchill IP Law

(57) ABSTRACT

A method is provided for managing and tracking scouting tasks to obtain map information using a fleet of autonomous vehicles. For instance, the method includes defining a scouting quest to obtain the map information. The scouting quest includes a plurality of objectives. Each objective is associated with a geographic location from which sensor data is to be captured. The method also includes receiving a first update message from an autonomous vehicle of the fleet. The update message identifies a location of the autonomous vehicle. The method also includes assigning at least one of the objectives to the autonomous vehicle based on the location of the autonomous vehicle. The method also includes, sending instructions to the autonomous vehicle in order to cause the autonomous vehicle to complete the at least one objective and after sending, tracking a status of the scouting quest.

20 Claims, 11 Drawing Sheets

| Objective Identifier | Last Completion | Marked completed? | Vehicle ID | Priority | Scouting Quest ID | Scouting Quest Completion |
|---|---|---|---|---|---|---|
| 0001 | T1 | Yes | 100 | 0 | Yes | 90% |
| 0002 | T2 | Yes | 100B | 0.3 | No | 10% |
| 0003 | T3 | No | 100 | 0.4 | Yes | 70% |
| 0004 | T4 | No | 100B | 0.7 | No | 50% |
| ⋮ | ⋮ | ⋮ | ⋮ | ⋮ | ⋮ | ⋮ |
| n | Tn | No | 100 | 1 | nn | 0% |

MANAGING AND TRACKING SCOUTING TASKS USING AUTONOMOUS VEHICLES

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location. Thus, such vehicles may be used to provide transportation services. Other systems which provide transportation services typically include drivers or conductors who are tasked with making decisions about how to operate vehicles. Such services may include some backend server systems which can dispatch vehicles to certain locations to provide transportations services as well as provide fleet management and vehicle staging instructions.

In addition, humans have historically "scouted" out areas by walking or drive them in order to captured images or make drawings. These have been used to create maps and other types of information. Typically, such scouting is performed by assigning persons to complete certain tasks or by having the vehicles drive around a service area randomly or in specific patterns when not otherwise required to be used for transportation services.

BRIEF SUMMARY

One aspect of the disclosure provides a method of managing and tracking scouting tasks to obtain map information using a fleet of autonomous vehicles. The method includes defining, by one or more computing devices, a scouting quest to obtain the map information, the scouting quest including a plurality of scouting objectives, each scouting objective of the plurality of scouting objectives being associated with a geographic location at which sensor data is to be captured; receiving, by the one or more computing devices, a first update message from an autonomous vehicle of the fleet, the update message identifying a location of the autonomous vehicle; assigning, by the one or more computing devices, at least one of the plurality of scouting objectives to the autonomous vehicle based on the location of the autonomous vehicle; sending, by the one or more computing devices, instructions to the autonomous vehicle in order to cause the autonomous vehicle to autonomously complete the at least one of the plurality of scouting objectives; and after sending the instructions, tracking, by the one or more computing devices, a status of the scouting quest.

In one example, each geographic location of each scouting objective of the plurality of scouting objectives is defined as an area through which a vehicle can pass in order to complete a corresponding scouting objective. In another example, the scouting quest includes one or more vehicles in the fleet of autonomous vehicles performing a type of maneuver at each of a plurality of locations within a predetermined period of time. In another example, the scouting quest includes visiting a plurality of intersections within a predetermined period of time. In another example, the scouting quest includes visiting a plurality of traffic signal lights within a predetermined period of time. In another example, the scouting quest includes visiting a plurality of stop signs within a predetermined period of time. In another example, the first update message further includes an indication that the autonomous vehicle is not currently providing transportation services and the assigning is further based on the indication. In another example, the method also includes receiving a second update message including an indication that the autonomous vehicle has completed the at least one of the plurality of scouting objectives. In another example, the method also includes receiving a second update message identifying an updated location for the autonomous vehicle and determining that the autonomous vehicle has completed the at least one of the plurality of scouting objectives. In this example, tracking the status is further based on the determining. In another example, the method also includes sending the scouting quest to the autonomous vehicle in order to incorporate the plurality of scouting objectives into a local version of the map information at the autonomous vehicle. In another example, each geographic location of each scouting objective of the plurality of scouting objectives is defined as a curve along which a vehicle can pass in order to complete a corresponding scouting objective. In another example, each geographic location of each scouting objective of the plurality of scouting objectives identifies a lane through which the vehicle can travel in pass in order to complete a corresponding scouting objective. In another example, the assigning is further based on a constraint indicating that the autonomous vehicle meets a hardware or software requirement. In this example, tracking the status includes recording a time when the at least one of the plurality of scouting objectives was completed in the table. In addition, the method also includes resetting the status of the at least one of the plurality of scouting objectives based on a predetermined period of time associated with the scouting quest. In another example, the method also includes receiving, from a second autonomous vehicle, a third update message identifying a pose and location of the second autonomous vehicle and updating status of the scouting quest based on the third update message. In this example, third update message indicates that the second autonomous vehicle is currently engaged in providing transportation services. In addition, updating the status of the scouting quest further includes determining whether the pose and location of the second autonomous vehicle indicates that the second autonomous vehicle is within an area of one of the plurality of scouting objectives. In another example, the scouting quest is associated with an urgency level, and wherein assigning the at least one of the plurality of scouting objectives is further based on the urgency level. In another example, determining whether at least one of the plurality of scouting objectives has been completed within a predetermined period of time, and wherein assigning the at least one of the plurality of scouting objectives is further based on the determining.

BRIEF DESCRIPTION OF THE DRAWINGS

FIGS. 9A-9B are example tables in accordance with aspects of the disclosure.

DETAILED DESCRIPTION

Overview

Figure 1:
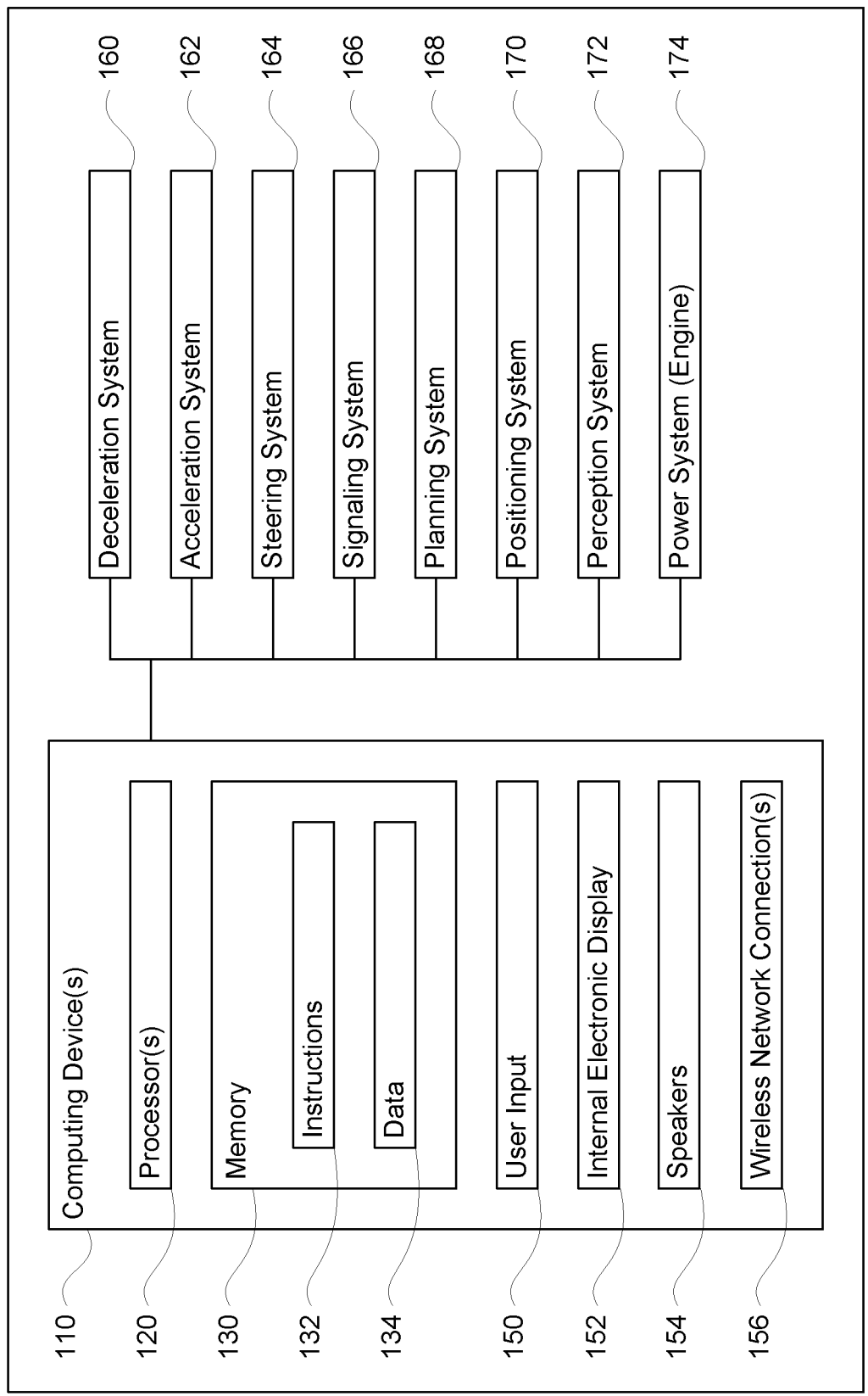
FIG. 1 is a functional diagram of an example vehicle in accordance with an exemplary embodiment.

The technology relates to using a fleet of autonomous vehicles to perform scouting tasks in order to ensure accuracy and freshness of map information. Typically, such scouting is performed by assigning persons to complete certain tasks or by having the vehicles drive around a service area randomly or in specific patterns when not otherwise required to be used for transportation services. However, for a fleet of autonomous vehicles which is also providing passenger and cargo transportation services, this can be a slow process which requires significant time and resources to complete. In order to achieve this, a fleet management system which employs a dispatching system, a scouting system, as well as the fleet of vehicles may be used.

The dispatching system may be configured to select vehicles for ride or transport services depending upon locations of the vehicles, passengers and/or cargo, destinations, etc. This dispatching system may also track the state of the vehicles using information provided by the vehicles. This information may be messages that include all state information for a given vehicle.

The scouting system may be configured to define scouting quests, scouting objectives and track completion of those objectives. A scouting quest may include a plurality of scouting objectives to be completed within a given period of time or timeframe. Each scouting objective may generally include a location for a vehicle to visit in order to capture sensor data for that area. These scouting objectives may be inserted into map information used by the vehicles to maneuver through the world. The scouting objectives may also have different geometry and/or metadata depending on what type of scouting is being handled by the scouting objective. In some instances, the scouting objectives may have certain vehicle requirements, such as certain software or hardware (e.g. sensor) versions or other constraints as discussed further below. This information may be inserted into the map information by periodically broadcasting this information to the vehicles and/or downloading the data directly to the vehicle's computing devices. The status of the scouting objectives may be stored in a scouting database, for instance in a visit table.

The scouting system may also determine which scouting objectives a vehicle should visit when it is not engaged in providing transportation services. These assignments may be determined based on the urgency of completing a particular quest, staleness of a particular scouting objective, as well as any vehicle requirements for those tasks. In addition, these assignments may be determined in order to complete scouting quests that are near completion (i.e. only have a few scouting objectives left), have not been completed within some time frame, or have simply not been completed ever as determined from the aforementioned table.

Once a vehicle is assigned a set of scouting objectives, the vehicle's computing devices may use a multi-destination search to determine how to best reach each scouting objective. In this way, the vehicles control their own routing rather than the scouting system. In addition, the scouting system may periodically identify which, if any, of the scouting quests and/or scouting objectives remain incomplete after some period of time.

The features described herein allow for the scouting of map information in real time while at the same time providing transportation services. By generating and tracking scouting objectives "off board" this allows the fleet management system to "divide-and-conquer" scouting needs across multiple vehicles as efficiently as possible. In addition, scouting objectives can be completed by vehicles passively when actually providing transportation services or actively when not so engaged. Further, by tracking the scouting objectives remotely at the scouting system, the scouting system is able to assign scouting objectives to available vehicles in order to complete scouting quests that are near completion (i.e. only have a few scouting objectives left), have not been completed within some time frame, or have simply not been completed ever as determined from the aforementioned table. The scouting system is also able to identify scouting objectives and scouting quests that have not been completed timely or ever and flag these for review in order to better utilize the resources of the fleet management system and the fleet of vehicles.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as BLUETOOTH, BLUETOOTH low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be control computing devices of an autonomous driving computing system or incorporated into vehicle 100. The autonomous driving computing system may capable of communicating with various components of the vehicle in order to control the movement of vehicle 100 according to primary vehicle control code of memory 130. For example, returning to FIG. 1, computing devices 110 may be in communication with various systems of vehicle 100, such as deceleration system 160, acceleration system 162, steering system 164, signaling system 166, planner or planning system 168, positioning system 170, perception system 172, and power system 174 (i.e. the vehicle's engine or motor) in order to control the movement, speed, etc. of vehicle 100 in accordance with the instructions 134 of memory 130. Again, although these systems are shown as external to computing devices 110, in actuality, these systems may also be incorporated into computing devices 110, again as an autonomous driving computing system for controlling vehicle 100.

As an example, computing devices 110 may interact with one or more actuators of the deceleration system 160 and/or acceleration system 162, such as brakes, accelerator pedal, and/or the engine or motor of the vehicle, in order to control the speed of the vehicle. Similarly, one or more actuators of the steering system 164, such as a steering wheel, steering shaft, and/or pinion and rack in a rack and pinion system, may be used by computing devices 110 in order to control the direction of vehicle 100. For example, if vehicle 100 is configured for use on a road, such as a car or truck, the steering system may include one or more actuators to control the angle of wheels to turn the vehicle. Signaling system 166 may be used by computing devices 110 in order to signal the vehicle's intent to other drivers or vehicles, for example, by lighting turn signals or brake lights when needed.

Planner system 168 may be used by computing devices 110 in order to determine and follow a route to a location. In this regard, the planner system 168 and/or data 132 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Figure 2:
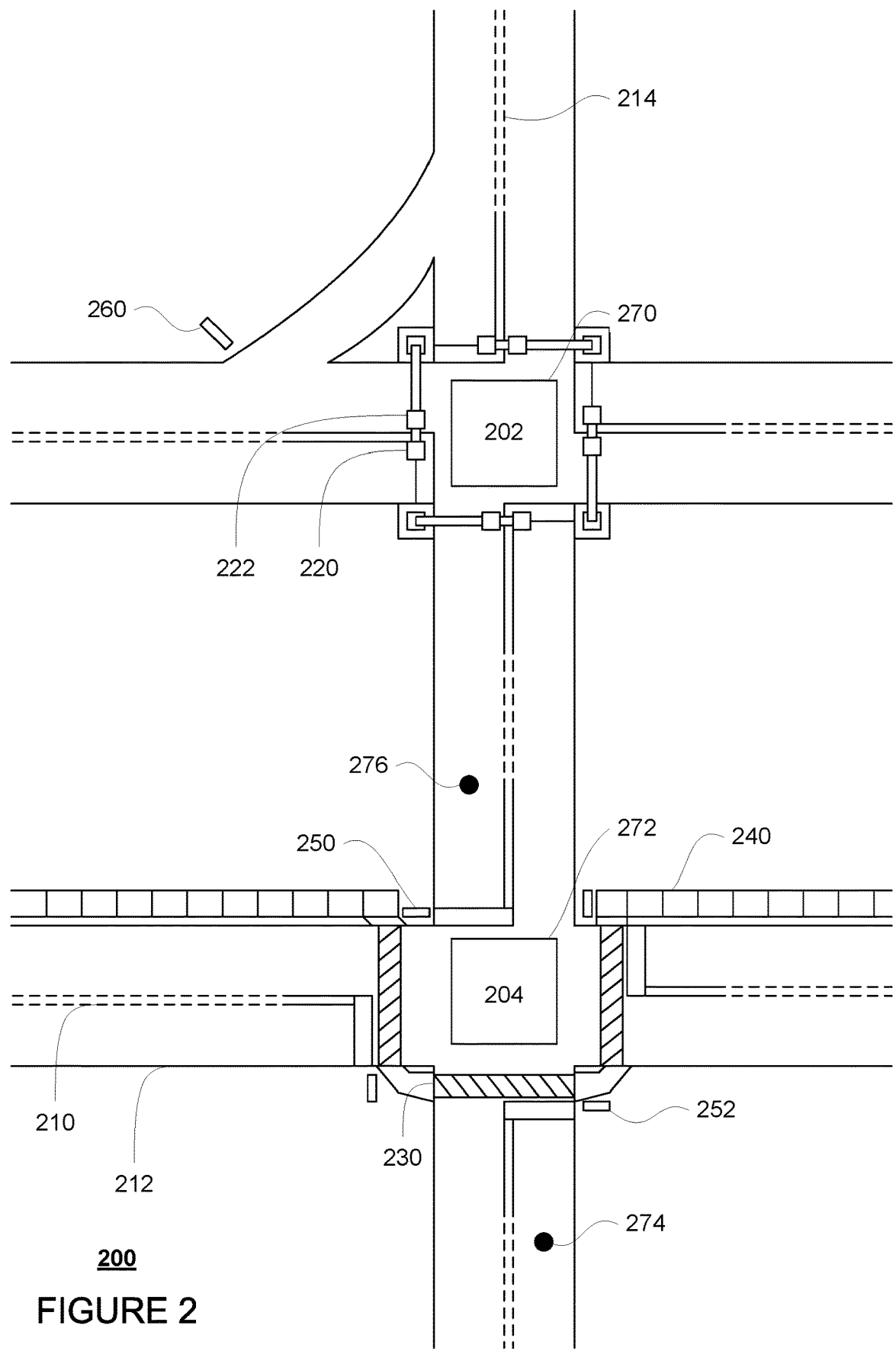
FIG. 2 is an example of map information in accordance with aspects of the disclosure.

FIG. 2 is an example of map information 200 for a section of roadway including intersections 202 and 204. The map information 200 may be a local version of the map information stored in the memory 130 of the computing devices 110. Other versions of the map information may also be stored in the storage system 450 discussed further below. In this example, the map information 200 includes information identifying the shape, location, and other characteristics of lane lines 210, 212, 214, traffic signal lights 220, 222, crosswalk 230, sidewalks 240, stop signs 250, 252, and yield sign 260. The map information may also store a plurality of scouting objectives and scouting quests as discussed in further detail below. In this example, polygon 270 represents a scouting objective for capturing sensor data for intersection 202, polygon 272 represents a scouting objective for capturing sensor data for intersection 204, and points 274 and 276 represent scouting objectives for capturing sensor data for stop signs 250 and 252, respectively. Although only a few scouting objectives are shown, this is merely for clarity and ease of understanding; the map information may actually include tens, hundreds or thousands of scouting objectives within the area of map information 200.

Although the map information is depicted herein as an image-based map, the map information need not be entirely image based (for example, raster). For example, the map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing devices 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

Figure 3:
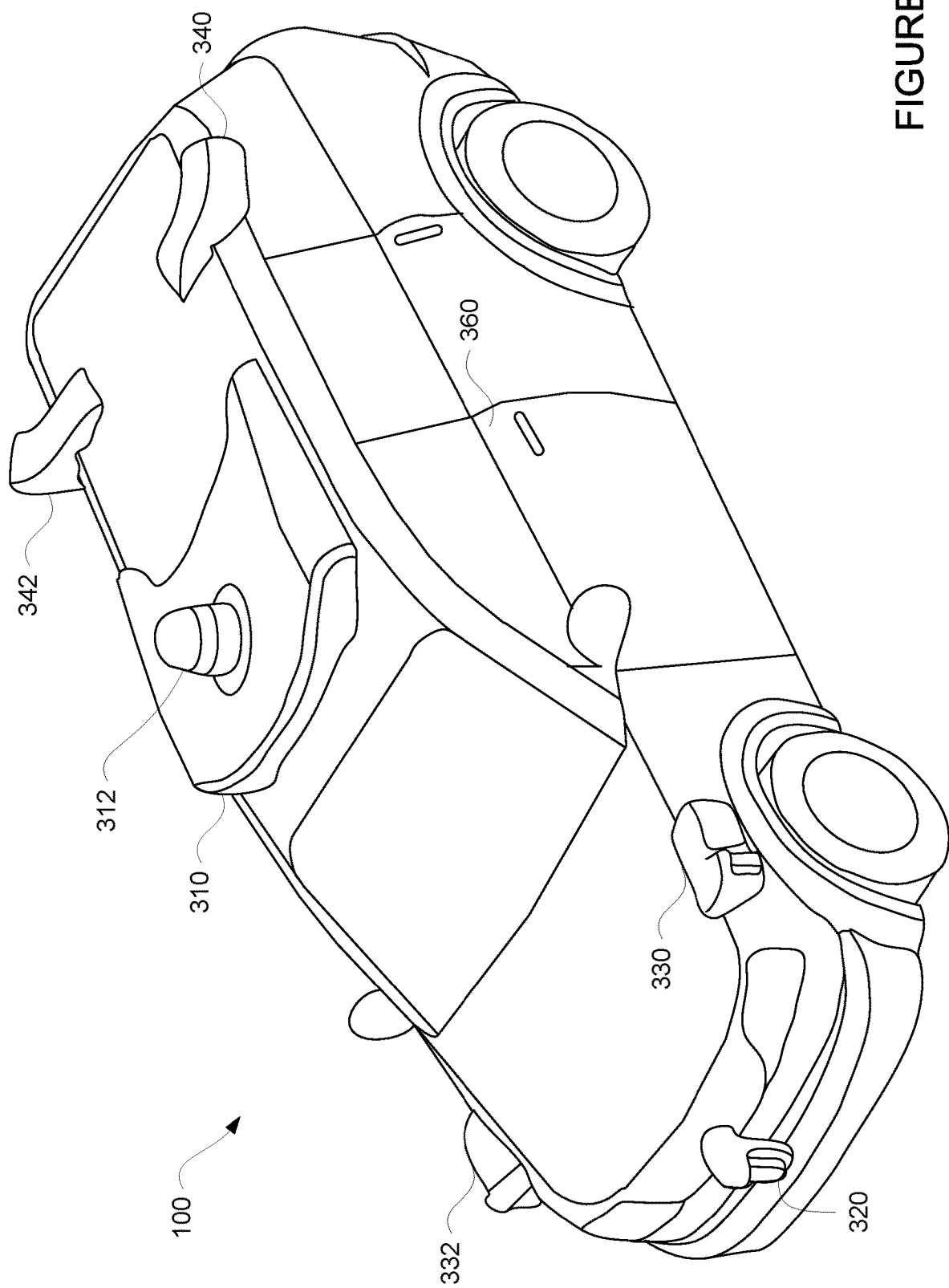
FIG. 3 is an example external view of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing device 110. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

The various systems of the vehicle may function using autonomous vehicle control software in order to determine how to and to control the vehicle. As an example, a perception system software module of the perception system 172 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module which uses various models based on object type to output a predicted future behavior for a detected object. In other instances, the characteristics may be put into one or more detection system software modules, such as a construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may uses various models to output a likelihood of a construction zone or an object being an emergency vehicle. Detected objects, predicted future behaviors, various likelihoods from detection system software modules, the map information identifying the vehicle's environment, position information from the positioning system 170 identifying the location and orientation of the vehicle, a destination for the vehicle as well as feedback from various other systems of the vehicle may be input into a planner system software module of the planner system 168. The planning system and/or computing devices 110 may use this input to generate a route and trajectories for the vehicle to follow for some brief period of time into the future. A control system software module of the computing devices 110 may be configured to control movement of the vehicle, for instance by controlling braking, acceleration and steering of the vehicle, in order to follow a trajectory.

The computing devices 110 may control the direction and speed of the vehicle by controlling various components. By way of example, computing devices 110 may navigate the vehicle to a destination location completely autonomously using data from the detailed map information and planner system 168. Computing devices 110 may use the positioning system 170 to determine the vehicle's location and perception system 172 to detect and respond to objects when needed to reach the location safely. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
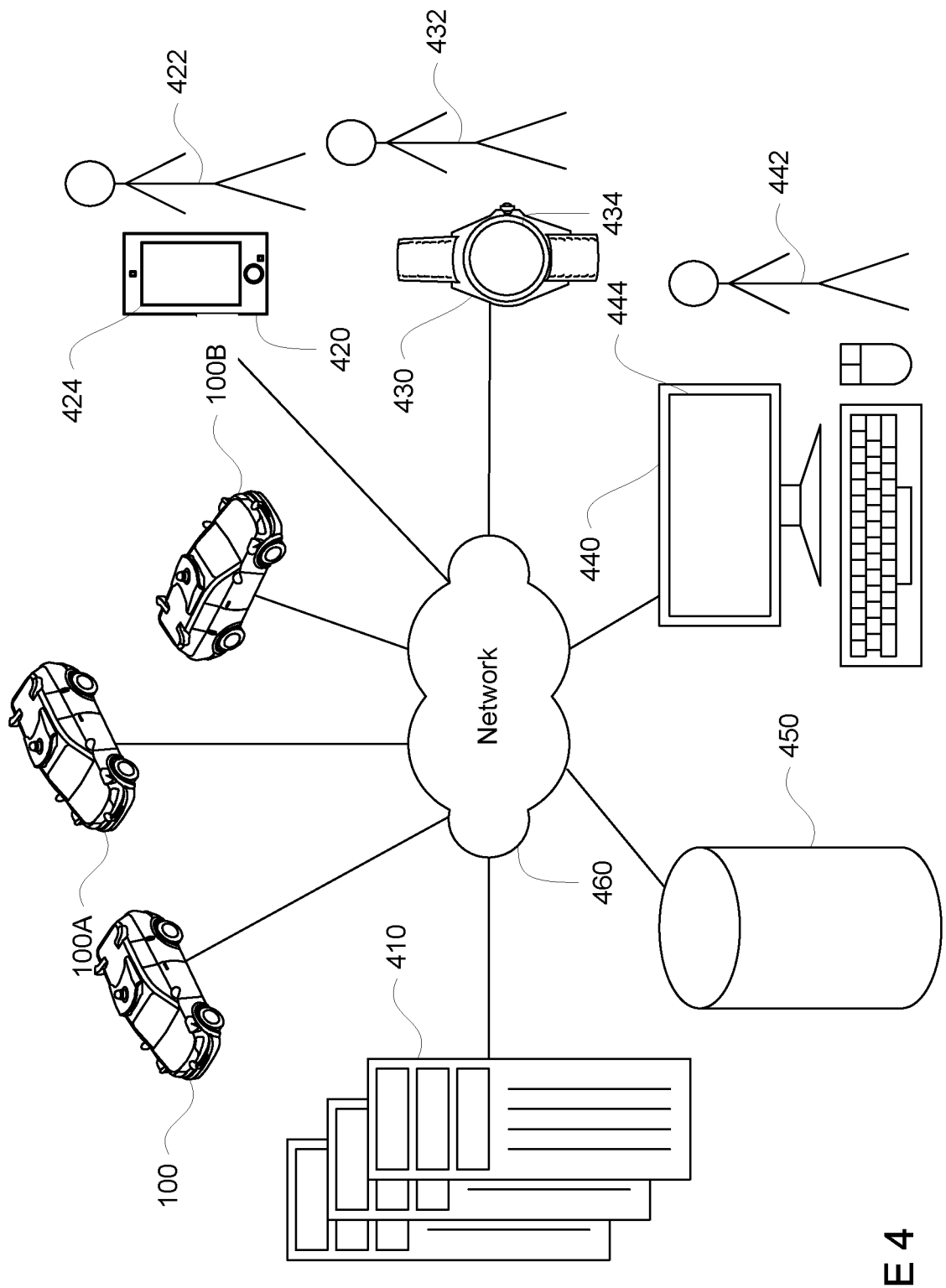
FIG. 4 is a pictorial diagram of an example system in accordance with an exemplary embodiment.
Figure 5:
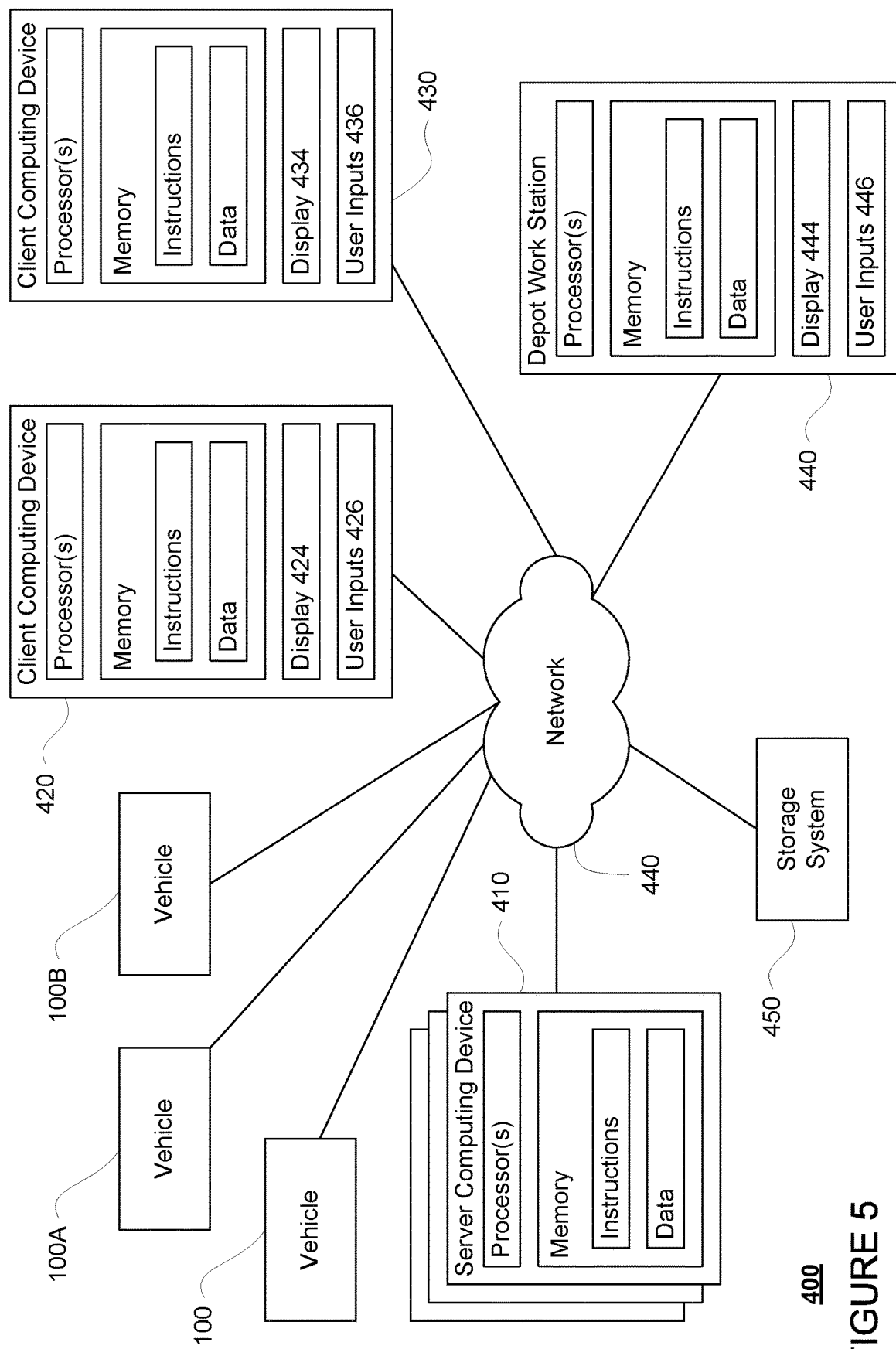
FIG. 5 is a functional diagram of the system of FIG. 4 in accordance with aspects of the disclosure.

Computing device 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicles 100A, 100B which may be configured the same as or similarly to vehicle 100. Although only a few vehicles and computing devices are depicted for simplicity, a typical system may include significantly more.

As shown in FIG. 5, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening nodes, may include various configurations and protocols including short range communication protocols such as BLUETOOTH, BLUETOOTH LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A, 100B as well as computing devices 420, 430, 440 via the network 460. For example, vehicles 100, 100A, 100B may be a part of a fleet of vehicles that can be dispatched by server computing devices to various locations. In this regard, the server computing devices 410 may function as a fleet management system. In addition, the vehicles of the fleet may send the server computing devices, as discussed further below, location information provided by the vehicle's respective positioning systems as well as other information relating to the status of the vehicles discussed further below, and the one or more server computing devices may track the locations and status of each of the vehicles of the fleet. In addition, fleet management system 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 4, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 4. As an example the user may input information using a small keyboard, a keypad, microphone, using visual signals with a camera, or a touch screen.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Storage system 450 may store various types of information as described in more detail below. This information may be retrieved or otherwise accessed by a server computing device, such as one or more server computing devices of the fleet management system 410, in order to perform some or all of the features described herein.

Figure 6:
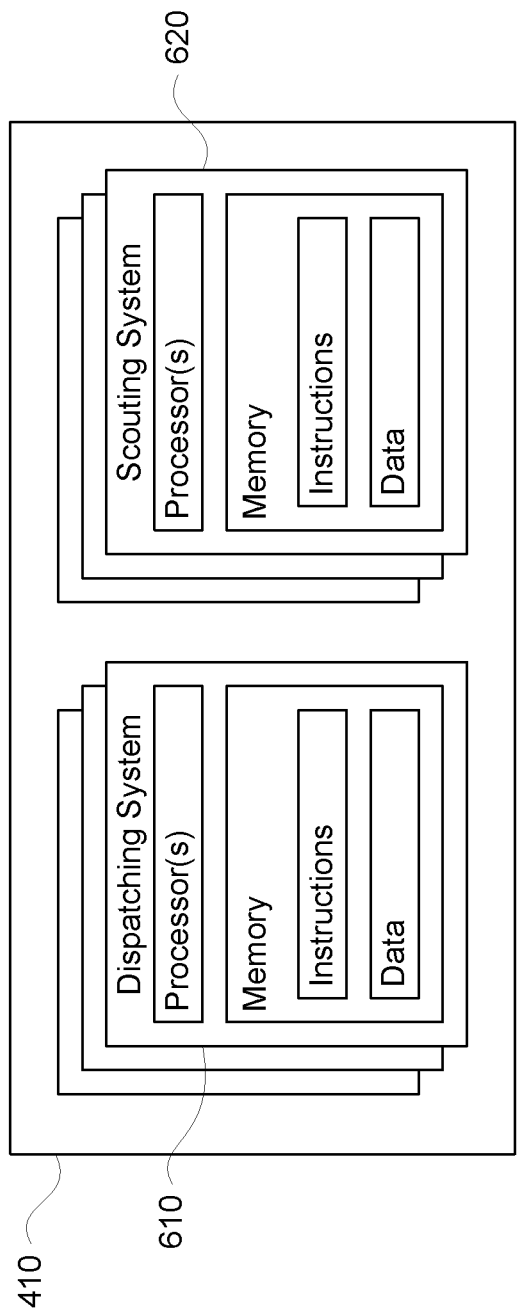
FIG. 6 is an example representation of a fleet management system in accordance with aspects of the disclosure.

FIG. 6 provides additional details of the fleet management system 410. In this example, the server computing devices may include a dispatching system 610 and a scouting system 620. Each of the dispatching system 610 and the scouting system 620 may include one or more computing devices configured, for instance, as shown with respect to the fleet management system 410. Although the dispatching system and the scouting system are depicted as distinct computing devices, these may be actually the same computing devices or the same group of computing devices and may be located proximate to one another or at great distances.

The dispatching system 610 may be configured to select vehicles for ride or transport services depending upon locations of the vehicles, passengers and/or cargo, destinations, etc. This information, including the locations of vehicles, status of passengers and/or cargo, destinations, etc. may be tracked, for instance, in a status table of the storage system 450. In this regard, all or part of the storage system 450 may be remote from or part of dispatching system 610 and/or fleet management system 410. The dispatching system 610 may also track the state of the vehicles using information that is periodically broadcast by the vehicles, specifically requested by the dispatching system and provided by the vehicles, or using other methods of tracking the states of a fleet of autonomous vehicles. This periodically broadcast information may include messages providing all state information for a given vehicle. For instance state messages may be self-consistent and generated based on rules about packaging the messages from various systems of the vehicles. As an example, the messages may include vehicle pose, lane information (i.e., in what lane the vehicle is currently traveling), as well as other information, such as whether the vehicle is currently providing transportation services, experiencing any errors or problems, etc.

The scouting system 620 may be configured to define scouting quests and scouting objectives, as well as to track completion of those quests and objectives, for instance, in the storage system 450. In this regard, all or part of the storage system 450 may be remote from or part of scouting system 620 and/or fleet management system 410. A scouting quest may include a plurality of scouting objectives to be completed within a given period of time or a timeframe. For instance, a scouting quest may include visiting all unprotected left turns in a service area of the fleet at least once per week, visiting all intersections in the service area once at least per week, getting images of traffic lights for all intersections at night time at least once per month, passing through every street in the service area at least once per week, checking for wet or snowy areas after precipitation, passing through all construction zone areas at least twice per day, etc.

The scouting objectives may be inserted into map information used by the vehicles to identify and complete the scouting objectives and quests. Each scouting objective, such as the scouring objectives represented in the map information and described above with regard to FIG. 2, may generally include a location or area for a vehicle to visit in order to capture sensor data for that area. This area may be represented by a point, such as for points 274, 276, a polygon, such as for polygons 270, 272, circle (for instance represented by a point and a radius), or any other shapes. As an example, each area, point, polygon, circle or other shape, may be specific to a road segment and/or lane of the map information having a particular direction of travel. In this regard, by simply driving or passing through the road segment and/or lane, the vehicle is able to complete the scouting objective. The areas of the scouting objectives also may have different geometry and/or metadata depending on what type of scouting is being handled or rather what type of data is to be collected by the scouting objective.

In some instances, the scouting objectives may have certain constraints or vehicle requirements, such as certain software or hardware (e.g. sensor) versions, levels of urgency, or other constraints as discussed further below. This information may be inserted into the map information by periodically broadcasting this information to the vehicles of the fleet, such as vehicles 100, 100A, and 100B, and/or downloading the data directly to the vehicles' computing devices.

Examples of scouting objectives may include intersection-based objectives, lane-level objectives, traffic light objectives, stop sign objectives, turning objectives (such as unprotected left turns, etc.), and so on. As one example, intersection based objectives may be defined as areas such as polygons or other shapes leading up to an intersection, such as polygon 270 of FIG. 2 for intersection 202. By passing through the polygon 270, a vehicle may be able to capture sufficient sensor data for the intersection 202. As another example, maneuver-type objectives may include curves that map to lanes where precision is required to allow vehicles to complete certain types of maneuvers, such as where information about unprotected left turns, u-turns, speed limits, cul-de-sacs, merges, and other freeform navigational paths is required.

At least some of these scouting quests and/or scouting objectives may include constraints. For instance, if a scouting quest is designed to find real world changes, such as new intersections or roads before they are opened up, the scouting quest may include visiting every street within the service area once per week. Of course, the scouting objectives of this scouting quest may be constrained to visiting streets that are typically missed when performing typical transportation services from any direction. As another instance, a scouting objective may require a vehicle to visit a certain location at a certain time of day from a certain direction or perspective and/or during certain weather and/or lighting conditions. For example, if a scouting quest is designed to find new or changed traffic light configurations, the scouting quest may include capturing sensor data (for instance, camera images) of each traffic light in the service area once per day. In addition, the scouting objectives of this scouting quest may be constrained to capturing traffic lights from a certain perspective or direction such that the lights on the traffic lights are visible in a camera image.

As another example, a constraint could include the vehicle "turning-on" a particular functionality, for instance implemented in hardware and/or software, as the vehicle approaches a location. For instance, a vehicle could be required to turn on certain modes of sensing or computing when reaching a location, such as a a machine learning model to detect traffic light configuration changes or new stop signs that is too expensive to run all the time, but can be run briefly as the vehicle passes through certain intersections in order to collect information for a scouting objective. Alternatively, rather than including explicit constraints in the scouting objective themselves, the scouting system could send commands to the vehicles to turn on the functionality as the vehicle approaches a location of a particular scouting objective.

As noted above, the scouting system 620 may also track the completion of scouting objectives and scouting quests. For instance, using the status messages from the vehicles, the scouting system may track the movements of the vehicles. From this, the scouting system may determine whether a vehicle has passed through a scouting objective and mark that scouting objective as completed. This may also include confirming whether the vehicle that completed the scouting objective has met any vehicle requirements for that scouting objective.

The status of the scouting objectives may be stored in a scouting database, for instance in a visit table of storage system 450. As an example, an entry in the table may include contain metadata about the visit including the vehicle identifier of the vehicle that visited, the autonomy mode of the vehicle at the time (to ensure the proper sensors were engaged to capture the sensor data), the time of the visit, etc. This information may allow engineers or other systems to retrieve the needed sensor data from the vehicles.

In addition, certain information in the table may be periodically refreshed. For instance, for a given quest which must be performed within a given period of time such as 7 days, the scouting objectives within the table may be "reset" to not complete or visited after 7 days or after 7 days from the last time the scouting objective was visited. Of course, the table may still store the data for each prior visit for record keeping purposes.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 7:
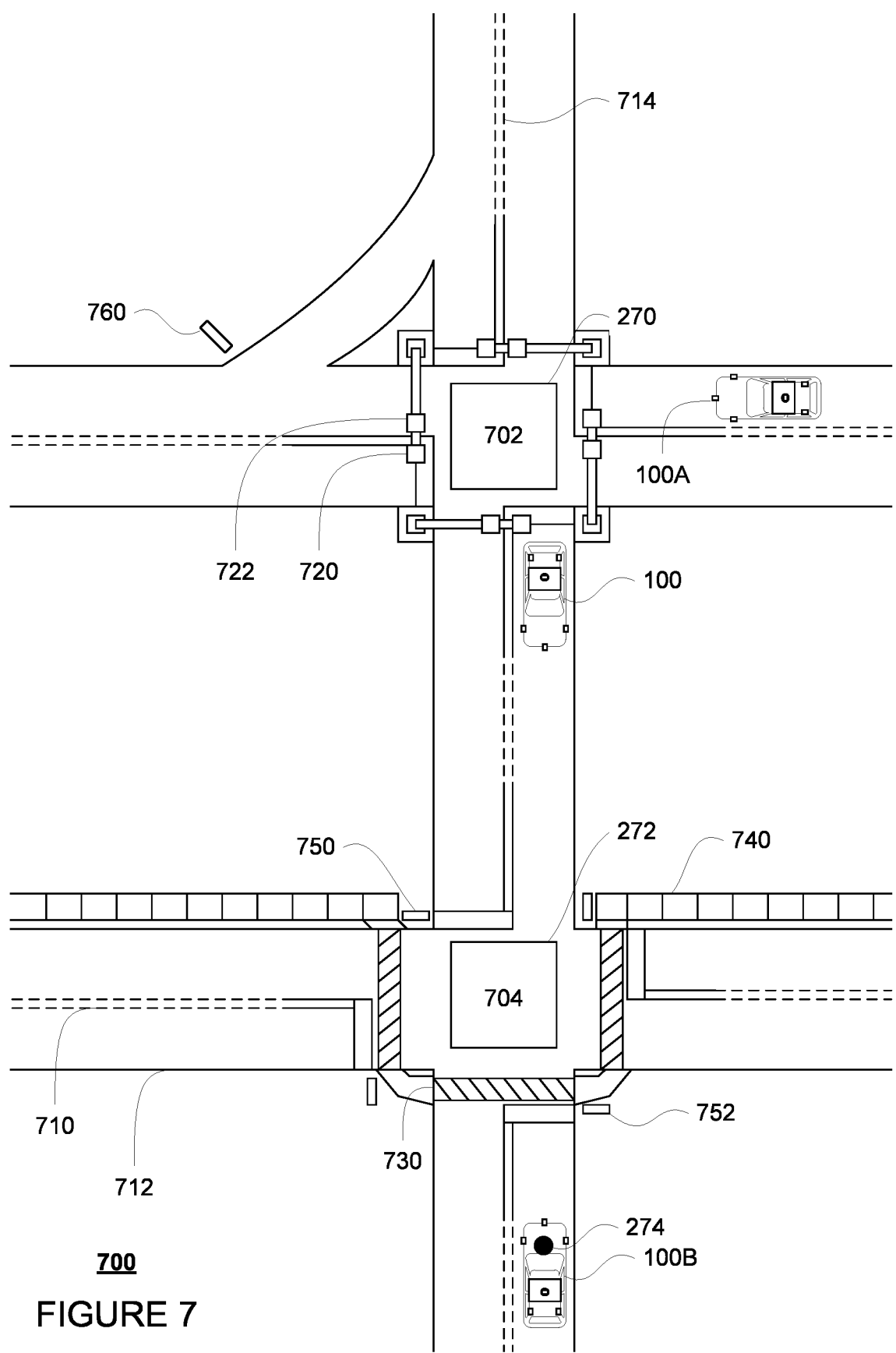
FIG. 7 is an example bird's eye view of a geographic area in accordance with aspects of the disclosure.

As noted above, the vehicles of the fleet drive around, they may report to their status to the server computing devices 410, for instance to the dispatching system 610 and/or the scouting system 620. Alternatively, one or more of the server computing devices may be dedicated to receiving these reports and updating the information of the storage system 450. For instance, FIG. 7 depicts vehicles 100, 100A, and 110B being maneuvered on a section of roadway 700 including intersections 702 and 704. In example of FIG. 7, intersections 702 and 704 correspond to intersections 202 and 204 of the map information 200, respectively. In this example, lane lines 710, 712, and 714 correspond to the shape, location, and other characteristics of lane lines 210, 212, and 214, respectively. Similarly, crosswalk 730 corresponds to the shape, location, and other characteristics of crosswalk 230, respectively; sidewalks 740 correspond to sidewalks 240; traffic signal lights 720, 722 correspond to traffic signal lights 220, 222, respectively; stop signs 750, 752 correspond to stop signs 250, 252, respectively; and yield sign 760 corresponds to yield sign 260.

Each vehicle's positioning system 170 may provide the vehicle's computing device 110 with the vehicle's location and position. The computing devices 110 may then send this information to the server computing devices 410 via update messages. These update messages may be periodically broadcast by each vehicle or specifically requested by the server and provided by the vehicles as discussed above. In addition to the vehicle's location, the different systems of the vehicle may also send information to the computing devices 110 such as whether the vehicle is currently providing transportation services. The dispatching system 610 and/or scouting system 620 may use these status reports to update the storage system 450. Thus, these systems may track the status of each vehicle over time.

In order to better assist the scouting system 620, the update messages generated by the vehicles may include information about scouting objectives. This may include, for instance, whether the vehicle's pose indicates that the vehicle is inside of a polygon of a scouting objective, whether the vehicle is in a lane belonging to a scouting objective, etc. In addition, because the scouting system is constantly tracking the locations of all vehicles, and not simply those that are not currently providing transportation services, the vehicles are able to complete scouting objectives even when they are not necessarily assigned or attempting to do so.

Figure 8:
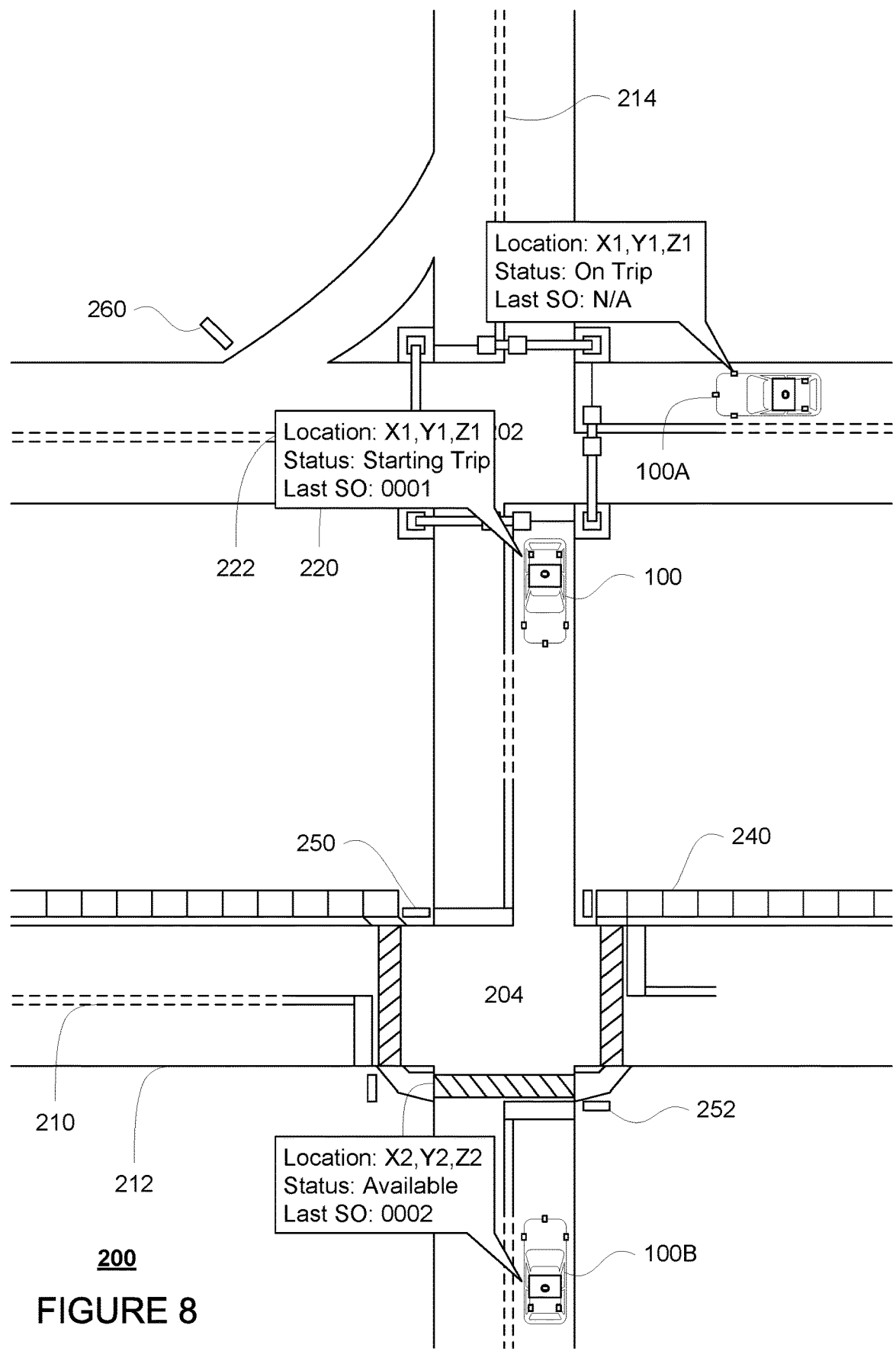
FIG. 8 is an example representation of data in accordance with aspects of the disclosure.

For instance, FIG. 7 depicts vehicles 100, 100A, and 110B being maneuvered on a section of roadway 700 including intersections 702 and 704. FIG. 8 depicts an example of the information tracked by the dispatching system and/or scouting system overlaid on the map information 200. For instance, each of vehicles 100, 100A, and 100B may report that its location as well as other status information. In this example, Vehicle 100 is reporting that it does not include any passengers or cargo (i.e. is not currently providing transportation services) but is on its way to do so, and that vehicle 100 has completed the scouting objective 0001 for polygon 270. Vehicle 100A is occupied or providing transportation services to passengers. Vehicle 100B is available to provide transportation services (i.e. Vehicle 100B is not on its way to pick up or drop off passengers and/or cargo) and has completed a scouting objective 0002 for point 274. The dispatching system 610 and/or scouting system 620 may use these status reports to update the storage system 450. Thus, these systems may track the status of each vehicle over time.

Figure 9A:
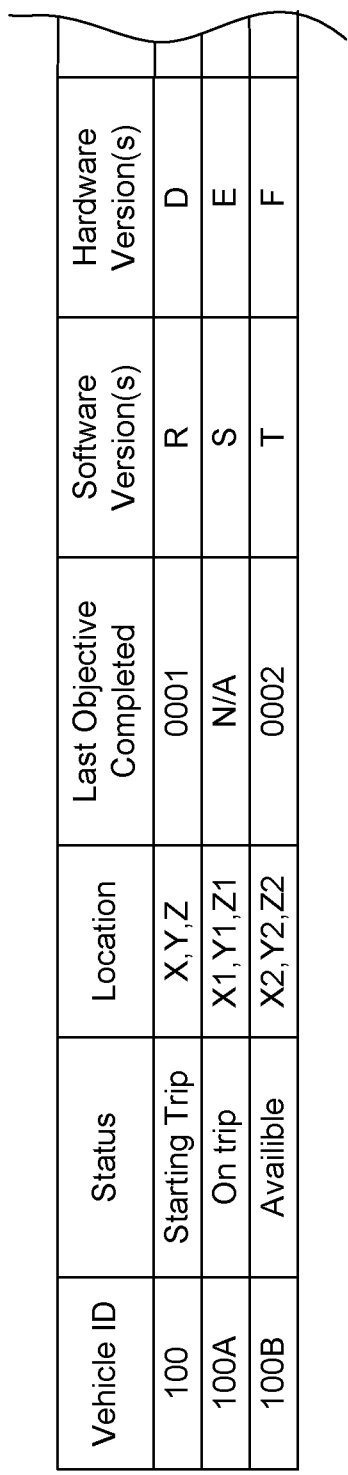

For instance, FIG. 9A is an example of a status table 900 for tracking the location and status of the vehicles of the fleet. As noted above, this status table may be stored in storage system 450 and may be accessible by the various computing devices of the fleet management system. In this example, the status table identifies each vehicle of the fleet as well as its trip status (whether the vehicle is currently providing transportation services), current location, and the last scouting objective visited by the vehicle. In this example, the dispatching system 610 may have updated the status table 900 to indicate the last locations reported by vehicles 100, 100A, and 100B as shown in FIG. 7. The status table 900 may also track other information useful for providing transportation services, such as the hardware and software versions running on the vehicles. This information in particular can be used to determine whether a vehicle has met or even can meet a constraint for a particular scouting objective, for instance by the vehicle's computing devices 110 and/or the scouting system 620.

For instance, FIG. 9B is an example of a visit table 950 for tracking the status of scouting objectives and scouting quests. As noted above, this status table may be stored in storage system 450 and may be accessible by the various computing devices of the fleet management system. In this example, the visit table identifies the scouting objective, the last time the scouting objective was completed, the vehicle that completed the scouting objective, whether the scouting objective is currently considered completed (i.e. the last time it was completed is considered recent enough), a priority level for the scouting objective, which scouting quest the scouting objective is included in, percentage of completion of that scouting quest, etc. In this example, the scouting system 620 may have updated the visit table 950 to indicate the scouting objective information reported by vehicles 100, 100A, and 100B as shown in FIG. 7 as well as any other scouting objectives that these vehicles may have completed simply by driving the points and/or areas of the scouting objectives (assuming the vehicles meet any constraints associated with these scouting objectives). The visit table 950 may also track other information useful for managing and tracking scouting requests, such as a vehicle identifier for the last vehicle assigned to complete the scouting objective. Although not shown, the visit table may also include more details about the last vehicle assigned to complete the scouting task and/or a vehicle that has completed the scouting task such as state information about the vehicle, including for instance, whether the vehicle was operating in an autonomous driving mode, what software the vehicle was or is running, what hardware the vehicle was or is using, etc.

Thus, the scouting system 620 may also determine which scouting objectives a vehicle should visit when it is not engaged in providing transportation services. For instance, a vehicle, such as vehicle 100A, may be assigned to complete a particular series of scouting objectives and/or an entire scouting quest. In this regard, at least part of a scouting quest may already have been completed by other vehicles. These assignments may be determined based on the urgency of completing a particular quest, staleness of a particular scouting objective, as well as any vehicle requirements for those tasks. For instance, it may be more urgent to visit all traffic lights than to drive an entire service area for the vehicles, as having accurate traffic light information is very important and some areas of the service area may never be visited during trip services. As another example, when driving the entire service area, it may be more important to drive all arterial roads at least once per day and through all residential neighborhoods at least once per month.

As a further example, urgency may be related to weather conditions. For instance, after a rainstorm, using weather data and historical knowledge of puddle forming, the scouting system may dynamically generate new scouting objectives and send all unoccupied vehicles to scout areas most heavily affected by puddles and rainfall. Such scouting may take precedence over all other scouting objectives. In this regard, once these dynamically generated objectives have been completed, the driverless service may continue.

In addition, these assignments may be determined in order to complete scouting quests that are near completion (i.e. only have a few scouting objectives left), have not been completed within some time frame, or have simply not been completed ever as determined from the aforementioned table. This may be achieved by taking a vehicle's location and nearby scouting objectives and seeing which scouting quest and/or scouting objectives the vehicle should be assigned. Of course, this may require balancing scouting objectives that are near (in distance/time) to the vehicle and scouting objectives that have not been seen recently or at all.

In one example, scouting objectives may be assigned in order to keep a vehicle near its current location. This may include performing a graph expansion from a given vehicle's current location to find the "X" closest scouting objectives which have not been visited as per the visit table 950 that belong to a quest that the vehicle is able to complete (e.g. the vehicle meets any hardware and/or software constraints for the quest) and a version of the map information 200 that may be stored in the storage system 450 and updated with the scouting objectives and quests as needed. The most stale of these (i.e. the scouting objectives which have been around the longest without being visited) and/or those with the highest urgency may be identified and assigned to the closest available vehicle, or rather, a vehicle which is not currently providing transportation services. The assignment may then be sent to the vehicle. This may be performed periodically, for instance, every 10 seconds or more or less, across all available vehicles.

As another example, scouting objectives may be assigned in order to send vehicles across longer distances in order to visit the most stale and/or most urgent objectives anywhere in the map information. This may include conducting a poll of the table to identify the scouting objectives which are outstanding (i.e. not visited or completed), performing a full graph expansion from each available vehicle's current location, and assigning each of these available vehicles to a predetermined number, for instance 10 or more or less, of closest scouting objectives while de-duplicating across the available vehicles. The assignment may then be sent to the vehicle. This may be performed periodically, for instance, every 10 seconds or more or less, across all available vehicles.

As another example, scouting objectives may be assigned based on a forward-looking approach. This may include conducting a poll of the visit table to identify the scouting objectives which are outstanding (i.e. not visited or completed). Next, the closest scouting location (A) to each available vehicle is identified (for instance, using the version of the map information stored in storage system 450), then the closest scouting location (B) from scouting location (A) is identified, then the next closest scouting location (C) from scouting location (B) is identified, and so on until a predetermined number of scouting locations, for instance 10 or more or less, are identified again while de-duplicating across the available vehicles. The assignment may then be sent to the vehicle. This may be performed periodically, for instance, every 10 seconds or more or less, across all available vehicles.

Once a vehicle is assigned a set of scouting objectives, the vehicle's computing devices, such as computing devices 110, may use a multi-destination search to determine how to best reach each scouting objective. In this way, the vehicles control their own routing rather than the scouting system 620. This may be especially useful in situations in which the fleet's capabilities are mixed. for instance, if the fleet includes multiple vehicle types using multiple different software releases (some of which may be more capable than others), may be useful to give the vehicle's computing devices options in case the onboard systems determine that one or more of its assignments are infeasible. This may also allow a vehicle to attempt to reach a scouting objective, and if unsuccessful (for instance due to a missed lane change, construction, etc.), to simply move onto another one without requiring "permission" from the dispatching or scouting systems. In some instances, missing an assigned scouting objective may be included in an update message from the vehicle to the scouting system in order to identify to the scouting system that the vehicle was not able to complete the scouting objective.

The scouting system 620 may periodically identify which, if any, of the scouting quests and/or scouting objectives remain incomplete after some period of time. For instance, the scouting system may also track which scouting objectives are assigned to which vehicles and then compare this against the table to determine whether the vehicle ever managed to complete the scouting objectives. This might involve storing metadata in the table for when a vehicle visits an objective and is identifying a scouting objective as completed in an update messages from the vehicle. Then we can match assignments with completed ones and find objectives that rarely or never get completed. These may be flagged for review in order to assess and/or remove those scouting objectives and/or scouting quests.

The visit table may also be used to restrict the provision of transportation services in areas which have not been visited within a predetermined period of time (i.e. the period of time for a particular quest). Similarly, the sensor data collected using the system may be used to make such decisions. For instance, during a rain event, the scouting system may "close off" all areas of the map information that are known to have heavy rain and/or form puddles easily, then prioritize scouting for rain-based scouting quests, and then open up after scouting quests have been completed and the service area or portions of the service area are confirmed safe for driving. For instance, an analysis of the data collected during the scouting quests could be done automatically (for example, with software that detects puddles of a certain size) or manually with human review, or as a hybrid where an automated system identifies potential hazards and humans review them. As another example, typically, providing transportation services would be a priority, but after a certain time or other threshold, the scouting system may prioritize scouting over providing transportation services, for instance, by actively labeling vehicles as unavailable for transportation services.

Although the examples described herein suggest that a vehicle is either operating in a scouting mode or in a transportation service mode, the system may actually be a hybrid of both where a vehicle's computing devices may actively consider scouting objectives en route to a user's destination. For example, if there are two otherwise equally-valid routes to a user's destination, it may make more sense to pick the one that passes by more scouting objectives. In this way, the system and fleet may be even more efficient at completing scouting objectives and scouting quests.

Figure 10:
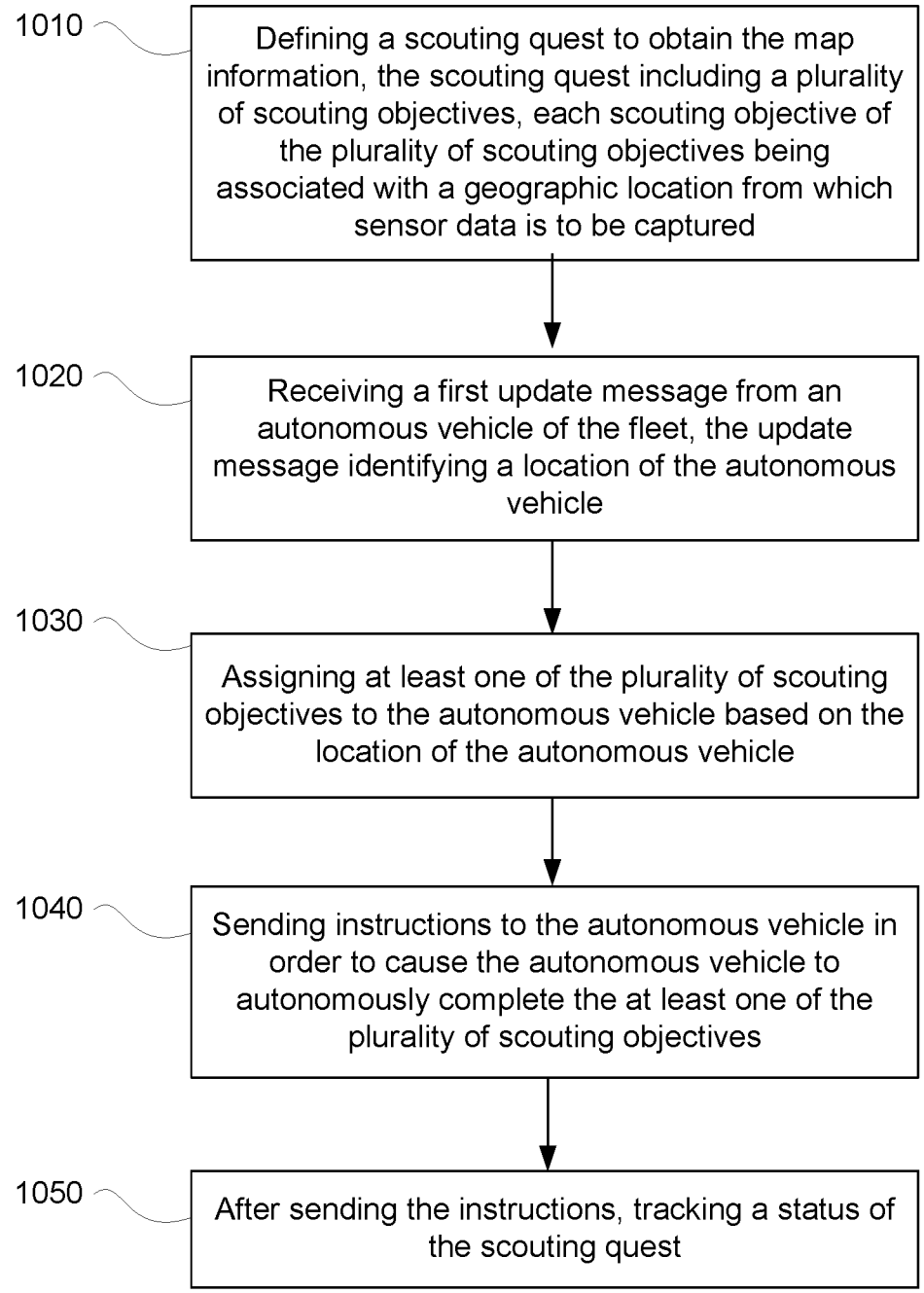
FIG. 10 is an example flow diagram in accordance with aspects of the disclosure.

FIG. 10 includes an example flow diagram 1000 of some of the examples managing and tracking scouting tasks to obtain map information using a fleet of autonomous vehicles as discussed above. In this example, the steps of flow diagram may be performed by one or more processors of one or more computing devices, such as processors of scouting system 620, dispatching system 610, and/or a combination of both. At block 1010, a scouting quest is defined to obtain the map information. The scouting quest includes a plurality of scouting objectives, each scouting objective of the plurality of scouting objectives being associated with a geographic location from which sensor data is to be captured. At block 1020, a first update message is received from an autonomous vehicle of the fleet, the update message identifying a location of the autonomous vehicle. At block 1030, at least one of the plurality of scouting objectives is assigned to the autonomous vehicle based on the location of the autonomous vehicle. At block 1040, instructions are sent to the autonomous vehicle in order to cause the autonomous vehicle to autonomously complete the at least one of the plurality of scouting objectives. At block 1050, after sending the instructions, a status of the scouting quest is tracked.

Again, the features described herein allow for the scouting of map information in real time while at the same time providing transportation services. By generating and tracking scouting objectives "off board" this allows the fleet management system to "divide-and-conquer" scouting needs across multiple vehicles as efficiently as possible. In addition, scouting objectives can be completed by vehicles passively when actually providing transportation services or actively when not so engaged. Further, by tracking the scouting objectives remotely at the scouting system, the scouting system is able to assign scouting objectives to available vehicles in order to complete scouting quests that are near completion (i.e. only have a few scouting objectives left), have not been completed within some time frame, or have simply not been completed ever as determined from the aforementioned table. The scouting system is also able to identify scouting objectives and scouting quests that have not been completed timely or ever and flag these for review in order to better utilize the resources of the fleet management system and the fleet of vehicles.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of managing and tracking scouting tasks to obtain map information using a fleet of autonomous vehicles, the method comprising:
    defining, by one or more computing devices, a scouting quest to obtain the map information, the scouting quest including a plurality of scouting objectives, each scouting objective of the plurality of scouting objectives being associated with a geographic location at which sensor data is to be captured;
    receiving, by the one or more computing devices, a first update message from an autonomous vehicle of the fleet, the first update message identifying a current location of the autonomous vehicle;
    identifying, by the one or more computing devices, from the plurality of scouting objectives, scouting objectives that have been pending without being visited by at least one of the fleet of autonomous vehicles;
    assigning, by the one or more computing devices, the identified scouting objectives to the autonomous vehicle based on the current location of the autonomous vehicle;
    sending, by the one or more computing devices, instructions to the autonomous vehicle in order to cause the autonomous vehicle to autonomously complete the identified scouting objectives; and
    after sending the instructions, tracking, by the one or more computing devices, a status of the scouting quest.

2. The method of claim 1, wherein each geographic location of each scouting objective of the plurality of scouting objectives is defined as an area through which the autonomous vehicle can pass in order to complete a corresponding scouting objective.

3. The method of claim 1, wherein the scouting quest includes one or more vehicles in the fleet of autonomous vehicles performing a type of maneuver at each of a plurality of locations within a predetermined period of time.

4. The method of claim 1, wherein the scouting quest includes visiting a plurality of intersections within a predetermined period of time.

5. The method of claim 1, wherein the scouting quest includes visiting a plurality of traffic signal lights within a predetermined period of time.

6. The method of claim 1, wherein the scouting quest includes visiting a plurality of stop signs within a predetermined period of time.

7. The method of claim 1, wherein the first update message further includes an indication that the autonomous vehicle is not currently providing transportation services and the assigning is further based on the indication.

8. The method of claim 1, further comprising receiving a second update message including an indication that the autonomous vehicle has completed the identified scouting objectives.

9. The method of claim 1, further comprising:
    receiving a second update message identifying an updated current location for the autonomous vehicle; and
    determining that the autonomous vehicle has completed the identified scouting objectives, wherein tracking the status is further based on the determining.

10. The method of claim 1, further comprising sending the scouting quest to the autonomous vehicle in order to incorporate the plurality of scouting objectives into a local version of the map information at the autonomous vehicle.

11. The method of claim 1, wherein each geographic location of each scouting objective of the plurality of scouting objectives is defined as a curve along which the autonomous vehicle can pass in order to complete a corresponding scouting objective.

12. The method of claim 1, wherein each geographic location of each scouting objective of the plurality of scouting objectives identifies a lane through which the autonomous vehicle can travel in order to complete a corresponding scouting objective.

13. The method of claim 1, wherein the assigning is further based on a constraint indicating that the autonomous vehicle meets a hardware or software requirement.

14. The method of claim 13, wherein tracking the status includes recording a time when the at least one of the plurality of scouting objectives was completed in a table.

15. The method of claim 14, further comprising, resetting the status of the identified scouting objectives based on a predetermined period of time associated with the scouting quest.

16. The method of claim 1, further comprising:
    receiving, from a second autonomous vehicle, a third update message identifying a pose and current location of the second autonomous vehicle; and
    updating status of the scouting quest based on the third update message.

17. The method of claim 16, wherein the third update message indicates that the second autonomous vehicle is currently engaged in providing transportation services.

18. The method of claim 16, wherein updating the status of the scouting quest further includes determining whether the pose and current location of the second autonomous vehicle indicates that the second autonomous vehicle is within an area of one of the plurality of scouting objectives.

19. The method of claim 1, wherein the scouting quest is associated with an urgency level, the urgency level determined based on requirement to visit traffic lights or arterial roads, and wherein assigning the identified scouting objectives is further based on the urgency level.

20. The method of claim 1, further comprising determining whether the identified scouting objectives have been completed within a predetermined period of time, and wherein assigning the identified scouting objectives is further based on the determining.

* * * * *